United States Patent [19]
Lindenmeier et al.

[11] Patent Number: 4,876,743
[45] Date of Patent: Oct. 24, 1989

[54] SIGNAL DIVERSITY ARRANGEMENT FOR MOBILE RECEPTION

[75] Inventors: Karl-Heinz G. Lindenmeier, Planegg; Gerhard Flachenecker, Ottobrunn, both of Fed. Rep. of Germany

[73] Assignee: U.S. Philips Corporation, New York, N.Y.

[21] Appl. No.: 127,827

[22] Filed: Dec. 1, 1987

[30] Foreign Application Priority Data

Dec. 2, 1986 [DE] Fed. Rep. of Germany ....... 3641109

[51] Int. Cl.⁴ .................................. H04B 11/16
[52] U.S. Cl. ................................. 455/133; 455/135; 455/275; 455/278
[58] Field of Search ........................ 455/132–135, 455/50, 272, 275, 276, 278, 296, 303; 375/100; 370/95, 100, 110.1

[56] References Cited
U.S. PATENT DOCUMENTS

| | | | |
|---|---|---|---|
| 4,498,885 | 2/1985 | Namiki | 455/278 |
| 4,512,034 | 4/1985 | Greenstein et al. | 455/278 |
| 4,578,819 | 3/1986 | Shimizu | 455/135 |
| 4,736,455 | 4/1988 | Matsue et al. | 455/278 |
| 4,742,568 | 5/1988 | Furuya | 455/135 |
| 4,756,023 | 7/1988 | Kojima | 455/134 |

OTHER PUBLICATIONS
"NTG Fachbrichte Band 72", p. 241, 3/80.

*Primary Examiner*—Robert L. Griffin
*Assistant Examiner*—Curtis Kuntz
*Attorney, Agent, or Firm*—David R. Treacy

[57] ABSTRACT

The invention relates to a signal diversity arrangement for a mobile reception, comprising a receiver and a diversity processor, which receives the input signals and applies a different input signal to the receiver when interference occurs. The diversity processor comprises an interference detector operating in the analog mode and a comparator, to whose first input is applied the output signal of the interference detector and to whose senond input is applied a suitably set voltage V1. The comparator shows on its output the occurence of interference by way of a binary signal when the threshold voltage V at the second input is exceeded. No less than one integrator is available having a discharging time constant, to whose input is applied a signal derived from the interference signal and whose time of integration is equal to the switching interval of one of the input signals and whose output signal is added to either the interference signal at the first comparator input such that when the interference is increased the total voltage at the first input of the comparator is increased also, or the output signal is applied to the second comparator input such that the threshold voltage is lowered when the interference rises. In the case of a series of integrators whose inputs each receive a signal derived from the interference signal of the associated input signal, the output signals of these integrators are each time applied to one of the comparator inputs and the threshold voltage V is changed each time in accordance with the interference signal during the switching interval.

12 Claims, 4 Drawing Sheets

SIGNAL DIVERSITY ARRANGEMENT FOR MOBILE RECEPTION

BACKGROUND OF THE INVENTION

The invention relates to a signal diversity receiving system for mobile reception of frequency modulated singals, comprising a receiver and a diversity processor, which receives the input signals and applies a different one of the input signals to the receiver when interference occurs on the signal currently being used.

Such an arrangement is, for example, known from the NTG-Fachberichte Band 72 (VDE Verlag), p. 241, picture 5b, as a scanning diversity combiner. In this case the diversity combiner selects one signal out of the two input signals offered, while that signal exceeds a specific predetermined voltage threshold Umin. Falling short of this level is considered by the combiner to be interference. The interference detector operates in a digital mode, and in the case of the combiner shown comprises a comparator having a threshold voltage At the output of the deletion signal is developed moving the switch into the other position.

Such a system has the disadvantage that when interference occurs as defined above, the switch is moved into the other position each time, regardless of the signal quality history of the signal applied to the signal input. For example, if the voltage at one of the two signal inputs has been essentially lower on average than the voltage at the other input over a long period of time, and then for a short period of time at the signal input with a larger signal on average the value falls below $U_{min}$, a switching through to the input with the signal which is worse on average will take place, although most probably a still worse signal is available there. In such a case the system often switches back and forth between the signal inputs at a very high switching rate. This leads to an additional disturbing element in the system, and a consequent degradation of the quality of the signal switched through to the receiver. When utilizing diversity aerial selection there will be consequent disturbing noise in the clock rate at the switching frequency on reception, which is often considered to be switching noise.

SUMMARY OF THE INVENTION

Therefore, it is an object of the invention with a signal diversity arrangement (1) for mobile reception to switch through to the receiver a signal input having a less disturbed signal on average rather than a signal input having a more disturbed signal on average.

This object is achieved in accordance with the invention in that the diversity processor (3) comprises an interference detector (5) oprating in the analog mode and a comparator (6), whose first input (7) receives the output signal of the interference detector and to whose second input (8) a suitably set voltage (V1) is applied and the comparator (6) shows on its output by way of a binary signal (10) the occurrence of interference when the threshold voltage V at the second input (8) is exceeded by the interference signal (9). One integrator (11) is available having a discharging time constant, to a signal (12, 20) derived from the interference signal is applied to at least one integrator (11) having a discharging time constant, whose time of integration is equal to the switching interval of one of the input signals (2). The integrator output signal is added either to the interference signal at the first comparator input (7) such that when the interference signal is increased the total voltage at this first input (7) of the comparator (6) is increased also, or the output signal at the second comparator input (8) is superimposed on the voltage V1, so that the threshold voltage V is lowered when the interference signal is increased or in the case of a series of integrators (11), whose inputs each receive a signal (12, 20) derived from the interference signal of the associated input signal (2), the output signals of these integrators (11) are each time applied to one of the two comparator inputs (7, 8) and, if necessary, the threshold voltage V is changed each time in accordance with the interference signal during the switching interval.

DESCRIPTION OF THE PREFERRED EMBODIMENTS

Figure 1:
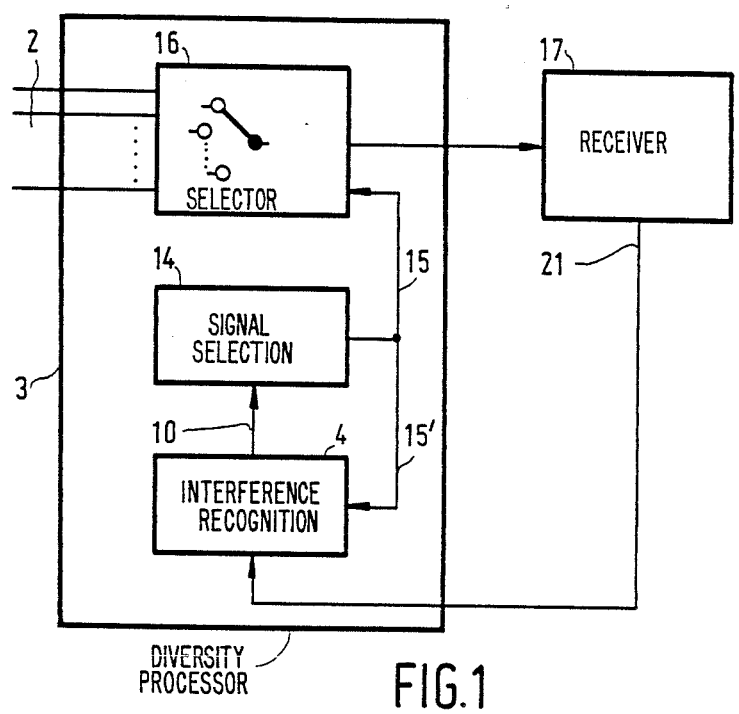
FIG. 1 is a block diagram of a signal diversity arrangement for mobile reception according to the invention comprising a diversity processor with an interference recognition circuit, a signal selecting circuit, a signal selector and a subsequent receiver.

FIG. 1 shows a singal diversity arrangement for mobile reception in accordance with the invention, comprising a diversity processor (3) having an interference recognition circuit (4) according to the invention, a signal selecting circuit (14), a signal selector (16) and a subsequent receiver (17). NTG-Fachberichte, Volume 72 (VDE-Verlag), page 241, FIG. 5b discloses in the scanning diversity combiner a comparator with a voltage threshold inlieu of the interference recognition circuit (4) and the signal selecting circuit (14). In the above combiner this voltage threshold is a timeinvariant value. In FIG. 1 of the present invention the interference recognition circuit (4) also has a threshold and when this threshold is passed the binary output signal (10) will indicate the presence of interference. This binary signal switches the signal selecting circuit (14) one step further, so that when the principle is applied in the most general sense, a binary code word (15) will be generated at the output of the signal selecting circuit (14), which code word brings the signal selector (16) in a desired position and thus a defined signal (2) is switched through to the receiver (17). According to the inventive idea the interference can have different origins. It can consist of, for example, adjacent channel interference, common-channel interference, noise jamming, intermodulation interference or multi-path reception interference owing to large differences in delay time.

Figure 2:
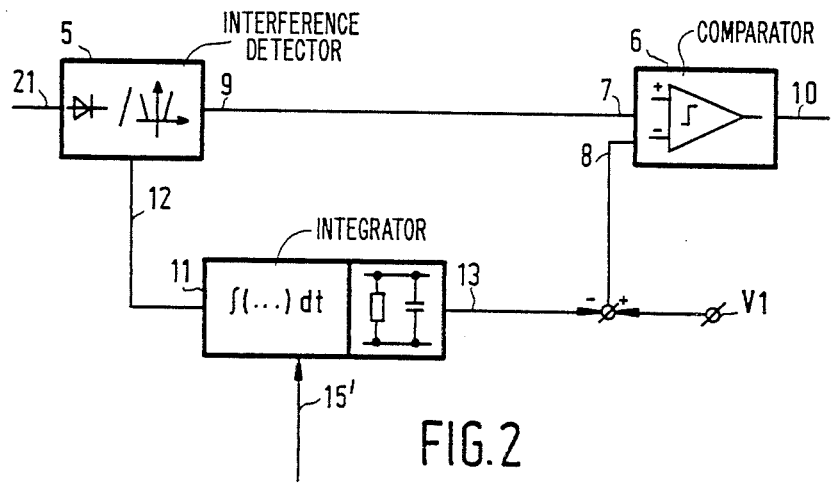
FIG. 2 is a block diagram of an interference recognition circuit comprising an interference detector operating in the analog mode, a subsequent integrator with a discharging time constant, and a comparator to whose signal inverting second input the output signal of the integrator is applied.

The invention is based on the fact that in the interference recognition circuit (4), whose block diagram is shown in FIG. 2 by way of example, an interference detector (5) operating in the analog mode is available, indicating the aforedescribed interference by means of an anaalog signal on its output (9). To initiate a switching operation this output signal (9) of the interference detector (5) can also be compared to a threshold voltage (8). The switching operation is initiated when the analog voltage (9), applied to a first input (7) of a comparator (6), exceeds the threshold voltage V on its second input (8). Subsequently, a binary signal (10) to trigger the signal selecting circuit (14) is available on the output (10) of the comparator (6). In an embodiment of the innovative idea the threshold voltage (8) is suitably arranged such, that this threshold voltage is lowered when there is a poor average signal quality. Thus, it is achieved that a smaller interference signal (9) already results in the arrangement being switched through by the binary signal (10). This signal quality is averaged by means of an integrator (11), to whose input is applied a signal (12) corresponding to the interference, which integrator is returned to a defined initial value after each switching operation.

In a particularly simple manner the integrator can be constituted by a capacitor. A discharging time constant 72 (for example, with a resistor arranged in parallel) is assigned to the integrating capacitor, in order not to allow the threshold (8) to be lowered too much by the signals (12) representing the interference and integrated in time with respect to the past. The resetting of the integrator (11) is effected in synchronism with the switching through by the binary address output signal (15'). Thus, the output signal (13) represents the average value against time of the interference in the signal(21) during the switching interval of a signal. When the threshold voltage (8) is lowered further, the recognition of interference in the signal (21) via the interference signal (9) becomes more sensitive.

In an advantageous manner the signal (13) is superimposed on a partial threshold voltage V1 in a summing circuit as shown in FIG. 2. This partial threshold voltage V1 generally represents the instantaneous value of the signal quality averaged over all input signals (2). If the interference recognition circuit (4) in FIG. 1 is replaced by the arrangement of FIG. 2 having the input signal (21) and the binary output signal (10), an advantageous integration is obtained, in that when a signal input (2) to which the receiver is switched receives a disturbed input signal, the threshold voltage (8) is lowered more rapidly on account of the integration against time with respect to the switching time of this input according as the signal quality at the relevant input has degraded. Thus, if the interference signal (9) occurs, an advanced switching operation is brought about by means of the comparator, and a signal more disturbed on average is switched through to the receiver for a shorter period of time if the instantaneous interference remains the same. The interference audible in the receiver is substantially proportional to both the instantaneous interference and the switching time of the interference signal. When reducing the switching interval in accordance with the measure of the invention the audible interference is reduced also. Thus, a signal having a better quality on average is switched through for a longer period of time than a signal of a poorer quality. This leads in the case of a plurality of inputs, to a distribution of the average switching times according to the signal qualities available at the separate inputs.

Figure 3:
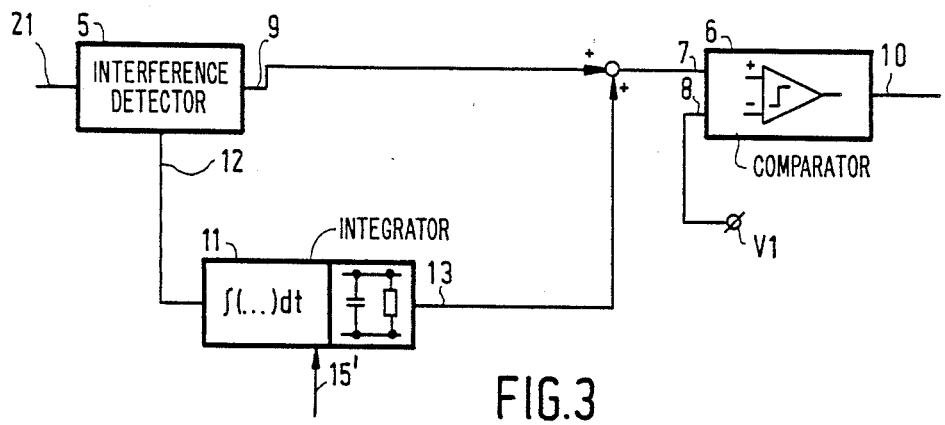
FIG. 3 is a similar diagram of an interference recognition circuit, comprising an interference detector operating in the analog mode, a subsequent integrator with a discharging time constant, and a comparator to whose signal noninverting first input the output signal of the integrator is positively applied.

FIG. 3 shows an interference recognition circuit (4) according to the invention, comprising an interference detector (5) operating in the analog mode with a subsequent integrator (11) having a discharging time constant, and a comparator (6). With this circuit an operation similar to that of the arrangement of FIG. 2 can be achieved in an advantageously simple manner, in that the non-inverting output signal (13) of the integrator (11) is superposed on the interference signal (9) at the output of the interference detector (5) operating in the analog mode with the aid of a summing circuit as shown in FIG. 3, and this signal is applied to the first input (7) of the comparator (6). The threshold voltage V1 having the aforedescribed features is then available in a similar mode at the second input (8) of this comparator. Thus, the output signal (13) of the integrator is not used for the formation of the threshold voltage V at the second input of the comparator (6), but the value for the average signal quality is additively superposed on the actual interference signal (9). Resetting the integrator can be effected in a similar way to that of the arrangement in FIG. 2.

Figure 4:
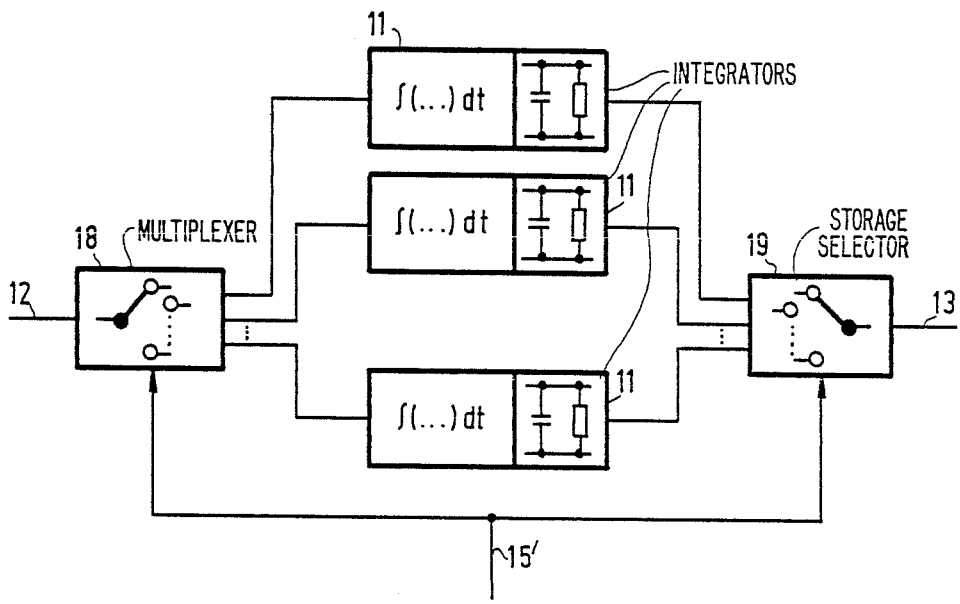
FIG. 4 is a diagram of a set of integrators, which are assigned to the relevant input signals and to which the interference signal occurring during this switch-through time is applied through a multiplexer, the output signal of the set being passed on to the comparator through the storage selector.

FIG. 4 shows a series of integrators (11) which are assigned to the relevant input signal (2) and which receive through a multiplexer (18) the signal (12) occuring during each switching interval and derived from the interference. The output signals of the integrators (11) are applied as signals (13) to one of the two inputs of the comparator (6) through a storage selector (19), which is driven in synchronism with the multiplexer (18), so that each time the output signal of the integrator is available at the input of the comparator which is assigned to the corresponding input signal (2). In this arrangement there is no resetting of the integrators (11) in line with the rate at which the interference recognition circuit is switched through.

This arrangement, shown in FIG. 4, is introduced into an advantageous further embodiment of the invention in lieu of the integrator (11) either as shown in FIG. 2 or in FIG. 3. The input signal is the signal (12) derived from the interference, the output signal (13) is either superposed on the interference signal (9) as shown in FIG. 3 or, as shown in FIG. 2, used to form the threshold voltage V at the second input (8) of the comparator.

In these arrangements a single integrator (11) is assigned to each input signal (2), which integrator is charged during each switching interval of the relevant signal input (2) via the signal (12) derived from the interference of the interference detector (5) operating in the analog mode. When switching the relevant input signal (2) through, the integrator is switched on with the aid of a multiplexer (18) controlled in synchronism with address output signal (15). When averaging by means of a capacitor and a resistor the above embodiments can be used. The separate output signals of the integrators (11) are alternately switched through to the common output by means of a storage selector (19) controlled in synchronism with the multiplexer (18). In contradistinction to the interference recognition circuit with only a single integrator, the interference recognition circuit shown in FIG. 4 operates with a series of integrators (11), which are not reset when a switching through takes place and whose charging condition changes into a discharging condition during the turn-off time according to a suitably chosen discharging time constant (T2). Thus, a separate evaluation is possible of the qualities of the signals previously available at the separate input signal (2). Therefore, this arrangement has the advantage that according to their average signal quality the signal inputs are switched through to the receiver for different time intervals approximately in the order of a list of priorities.

Figure 5:
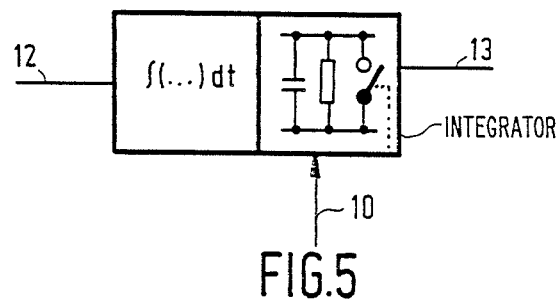
FIG. 5 is a diagram of an integrator having a reset value adjustable to a specific initial value.

In an advantageous further embodiment of the invention according to an arrangement as shown in FIG. 2, integrators (11) are used having a reset value adjustable to a specific initial value as shown in FIG. 5. By suitably allowing for this initial value the mode of operation of the integrators can be ideally adapted to a receive condition.

Figure 6:
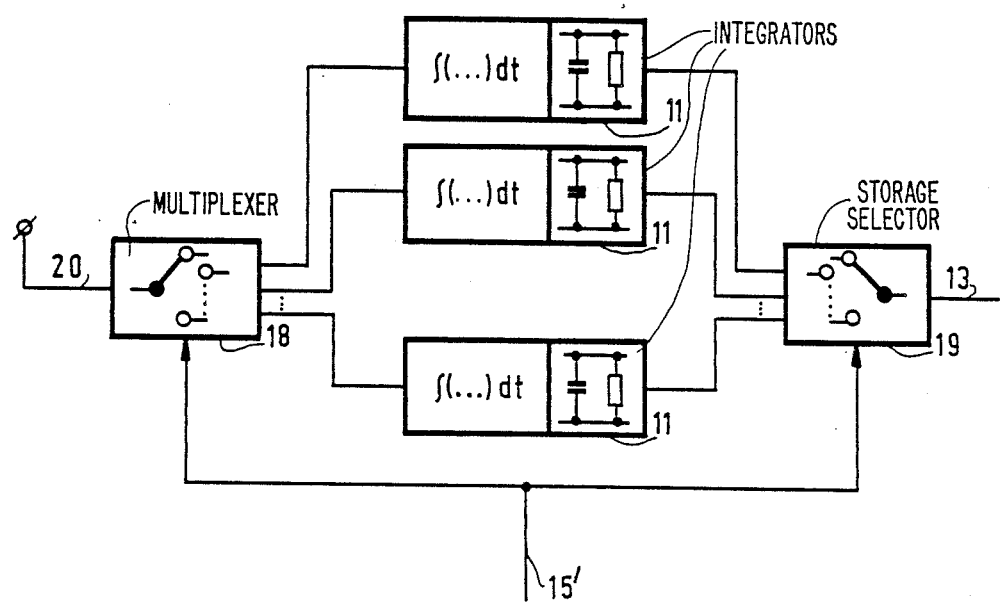
FIG. 6 is a diagram of a series of integrators assigned to the relevant input signals, to which has been applied through a multiplexer, for example, a time-constant voltage value, the output signals of the series being applied to the comparator through the storage selector.

In an extremely simple embodiment of the invention the averaging of the interference on the respective input signal (2) is effected with the aid of the switching time of a signal input. An arrangement of this type is shown in FIG. 6. For this purpose both the multiplexer (18) and the storage selector (19) are switched through in line with the switch-through rate of the signal selector (16). This is effected with the aid of signal (15'), which is identical with the signal used to switch the signal selector (16) through. To receive a value for the average switching interval of each input signal (2) separately, a time-constant voltage (20) is applied to the input of the multiplexer (18). Thus, the output signal of each integrator (11) corresponds to the charging and discharging time constants of the average switching interval of the respective signal inputs. As regards the choice of the time constants T1 and T2, the same characteristic features are found as those described for the arrangement shown in FIG. 4. In this manner it is also achieved that in view of their average signal quality the signal inputs are switched through to the receiver for different periods of time according to the range of a list of priorities.

Figure 7:
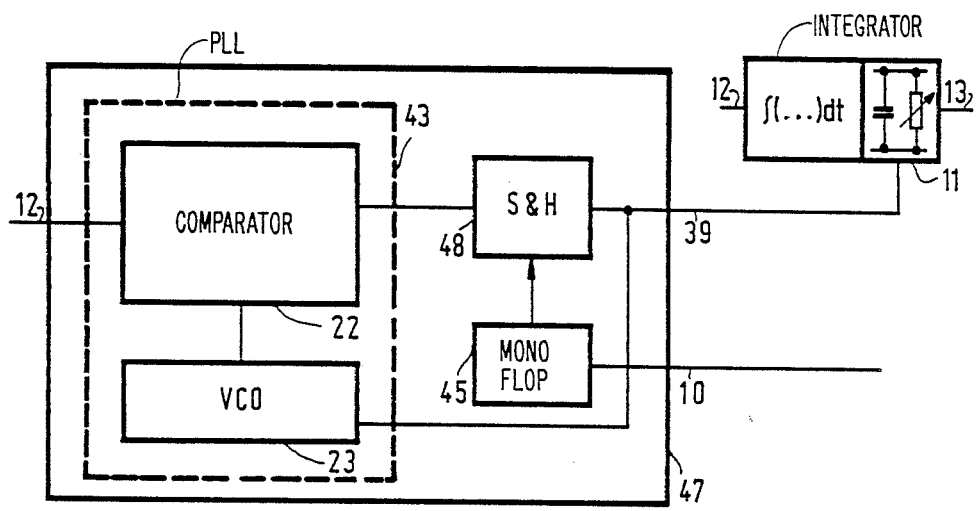
FIG. 7 is a diagram of an interference frequency detector, comprising a PLL circuit, a sampleand-hold evaluating means, and a monoflop which is triggered by the binary switching signal, the output voltage of the sample-and-hold section being used to control the discharging time constant in the integrator.

FIG. 7 shows an interference frequency detector, composed of a PLL circuit (43), a sample and hold circuit (48) and a monoflop (45), which is triggered by the binary switching signal (10). The output voltage of the sample and hold circuit is used to control the discharging time constant in the integrator. This arrangement is in a position to indicate the average frequency at which interference occurs. This is effected by comparing the frequency of the subsequent VCO (23) to the repetition frequency of the interference of the signal (12) derived from the interference. The sample and hold circuit, which is clocked by means of a monoflop (45) triggered by a binary switching signal (10), is instrumental in producing at the output the signal (39) with which the time constants of the integrator are controlled in the manner described in the Claim 3.

Figure 8:
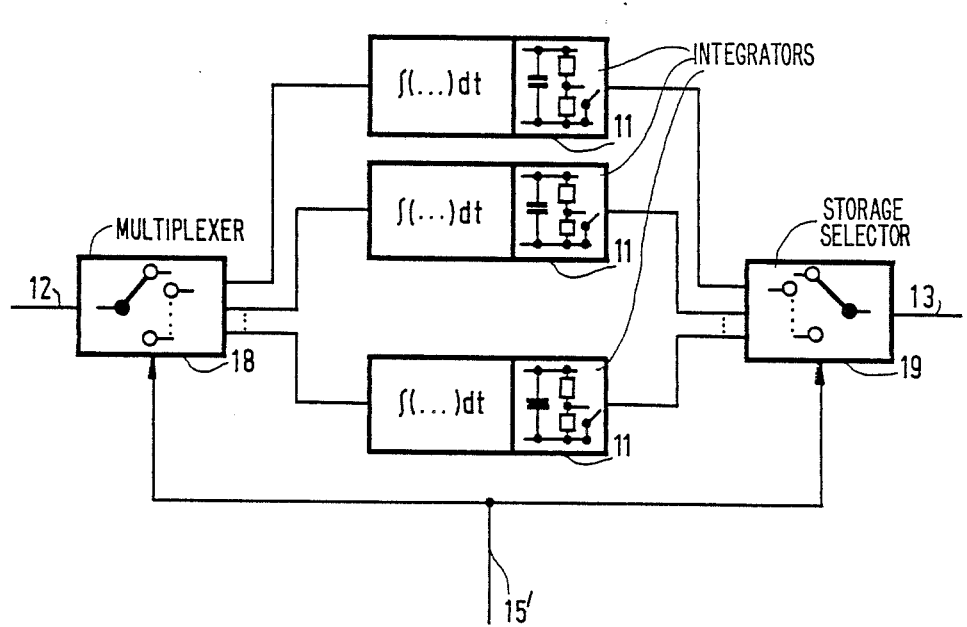
FIG. 8 is a diagram of a series of integrators having a switchable time constant for the charging and discharging processes switching over being effected, for example by means of bridging switches.
Figure 9:
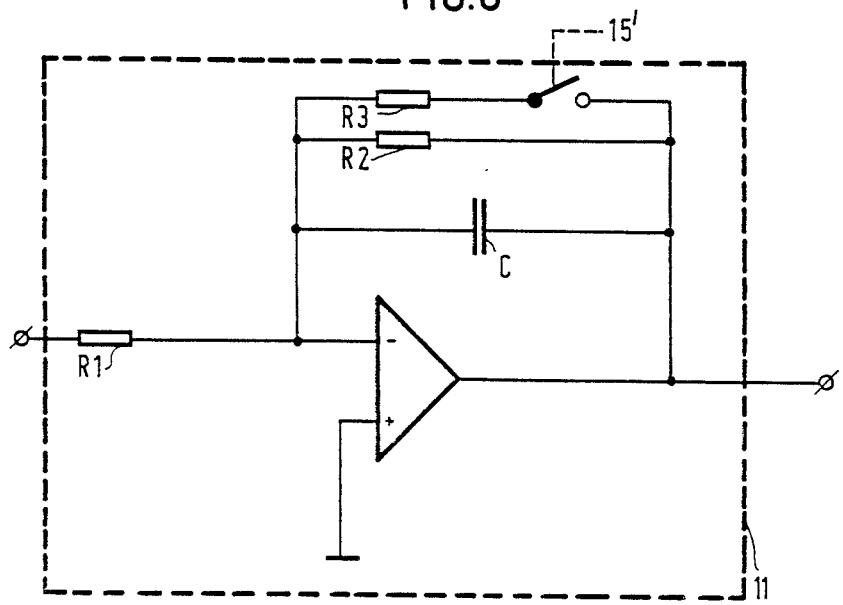
FIG. 9 is a diagram of an integrator having switchable time constants, comprising an operational amplifier and a controllable switch, which is switched in line with the rate of the address output signal.

If the discharging time constant (T2) of the integrators (11) is too large, owing to the effect of the storage, the signal quality qhich was previously available at a specific input is valued too strongly compared to the actual signal quality. If the charging time constant is too large, the storages will start operating too slowly. Therefore, in a particularly advantageous embodiment of the invention each integrator (11), as shown in FIG. 8, receives a suitably chosen charging time constant T1 and a discharging time constant T2 which can be adjusted separately. This is effected in a manner known per se by means of two different resistors and bridging switches, as is shown, for example, in a simple embodiment in FIG. 8. In accordance with the invention this switch is switched at the rate of the address output signal (15'), so that in the integrator the charging time constant T1 appears during the switching interval of the relevant input and the discharging time constant T2 during the remaining time periods. This arrangement in FIG. 8 has the advantage that in view of their average signal quality the signal inputs are switched through to the receiver for different periods of time according to the range of a list of priorities also in case the reception is difficult. By means of a switch, which in a manner known per se can also be designed as a semiconductor switch, an operational amplifier, a charging capacitor and three resistors, the circuit for such an integrator is realized in a particularly simple manner as shown, for example, in FIG. 9. This circuit can be implemented for each of the integrators shown in Figure 4, as well as for the respective integrators shown in the FIGS. 2 and 3. The arrangement of T1 and T2 is effected each time in accordance with the invention in such a manner as claimed in the claims.

What is claimed is:

1. A signal diversity receiving system comprising a receiver and a diversity processor, said processor comprising means for applying a selected one of a plurality of input signals to said receiver, and means for applying a different one of said input signals to said receiver after a switching interval, in case of interference affecting said selected one, characterized in that said means for applying a different one comprises an interference detector operating in an analog mode, and a comparator having first and second inputs, said interference detector having an output connected to said first input, further comprising means for applying a set value to said second input, said comparator having a binary signal output indicative of interference when said output of said interference detector exceeds said set value, at least one integrator having a discharging time constant, means for deriving a signal from said interference detector output and applying that signal to said at least one integrator, said at least one integrator having a time of integration equal to said switching interval, and means for adding said integrator output signal to one of said comparator inputs for varying a relationship between a magnitude of the interference detector output and said set value when the interference signal increases.

2. A system as claimed in claim 1, for receiving one of a given number of said input signals, said means for applying a different one comprising said given number of said integrators,
- a multiplexer for applying a respective interference detector output signal corresponding to a respective input signal to a respective integrator,
- means for applying a time constant signal to said multiplexer during a respective switching interval of the respective input signal,
- a storage selector for receiving and storing the respective integrator outputs, for applying the integrator output corresponding to a respective input signal during a switching interval in which the multiplexer is applying the corresponding input signal to the respective integrator, and
- means for controlling said multiplexer and said storage selector by a common digital address signal.

3. A system as claimed in claim 1, characterized in that said interference detector output signal is applied to said at least one integrator having a discharging time constant.

4. A system as claimed in claim 3, characterized in that said at least one integrator has a charging time constant T1 higher than an average time period between successive interference signals during operation.

5. A system as claimed in claim 4, characterized in that said processor comprises a signal selecting circuit having a digital address output signal, and a signal selector receiving said digital address output signal, said means for applying a different one connecting the respective input signal corresponding to the digital address output signal to the receiver,
- said at least one integrator comprising a respective integrator for each of said plurality of input signals, each of said integrators having a switched discharging time constant,
- a multiplexer receiving said input signals and an interference detector output signal, for applying a respective input signal to the respective associated integrator during the multiplexer switching interval of the respective input signal, and
- a storage selector for applying the output signal of each respective integrator to the comparator second input during said switching interval.

6. A system as claimed in claim 4, characterized in that said processor comprises one only integrator having a discharging time constant, and means for setting said integrator to a predetermined initial value after each switching operation.

7. A system as claimed in any one of claims 1-6, comprising means for providing a proportional output signal which is proportional to the average interference frequency and is applied to said at least one integrator, and means for reducing respective time constants of said at least one integrator when said interference frequency increases.

8. A system as claimed in claim 7, characterized in that said means comprises a phase locked loop circuit having a mixer with a low pass filter, providing a first separate output, a voltage controlled oscillator providing a second separate output, a sample and hold circuit with a low pass filter receiving an output of said mixer, and means for driving a control input of said sample and hold circuit through a monoflop, and means for driving said monoflop by said binary signal.

9. A system as claimed in claim 4, characterized in that said integrator output signal is applied to said receiver, and said receiver comprises adjustable means for reducing said signal responsive to increase in the interference of the selected input signal as a function of said integrator output signal.

10. A system as claimed in claim 1, characterized in that said integrator output signal is applied to said receiver, and said receiver comprises adjustable means for reducing said signal responsive to increase in the interference of the selected input signal as a function of said integrator output signal.

11. A system as claimed in claim 1, characterized in that said processor comprises a signal selecting circuit having a digital address output signal, and a signal selector receiving said digital address output signal, said means for applying a different one connecting the respective input signal corresponding to the digital address output signal to the receiver,
- said at least one integrator comprising a respective integrator for each of said plurality of input signals, each of said integrators having a switched discharging time constant,
- a multiplexer receiving said input signals and an interference detector output signal, for applying a respective input signal to the respective associated integrator during the multiplexer switching interval of the respective input signal, and
- a storage selector for applying the output signal of each respective integrator to the comparator second input during said switching interval.

12. A system as claimed in claim 1, characterized in that said processor comprises one only integrator having a discharging time constant, and means for setting said integrator to a predetermined initial value after each switching operation.

* * * * *

UNITED STATES PATENT AND TRADEMARK OFFICE
CERTIFICATE OF CORRECTION

PATENT NO. : 4,876,743
DATED : October 24, 1989
INVENTOR(S) : Lindenmeier et al

It is certified that error appears in the above-identified patent and that said Letters Patent is hereby corrected as shown below:

In the title page, under "[75] Inventors:" change "both" to --Ernst Manner, Ottobrun, all--.

Signed and Sealed this

Fifteenth Day of January, 1991

Attest:

HARRY F. MANBECK, JR.

*Attesting Officer*  *Commissioner of Patents and Trademarks*